United States Patent
Jalali

(10) Patent No.: US 11,585,587 B2
(45) Date of Patent: Feb. 21, 2023

(54) SYSTEM AND METHOD FOR PACKAGE CONSTRUCTION

(71) Applicant: Walmart Apollo, LLC, Bentonville, AR (US)

(72) Inventor: Rohit Jalali, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 259 days.

(21) Appl. No.: 17/126,353

(22) Filed: Dec. 18, 2020

(65) Prior Publication Data
US 2021/0102740 A1     Apr. 8, 2021

Related U.S. Application Data

(63) Continuation of application No. 16/401,281, filed on May 2, 2019, now abandoned.
(Continued)

(51) Int. Cl.
*F25D 3/12* (2006.01)
*G06F 16/901* (2019.01)
(Continued)

(52) U.S. Cl.
CPC ........... *F25D 3/125* (2013.01); *B65B 5/02* (2013.01); *B65B 57/00* (2013.01); *G06F 16/901* (2019.01);
(Continued)

(58) Field of Classification Search
CPC ...... F25D 3/125; F25D 3/12; F25D 2303/084; F25D 2600/06; B65B 5/02; B65B 57/00;
(Continued)

(56) References Cited

U.S. PATENT DOCUMENTS 5,522,216 A    6/1996   Park
5,661,955 A    9/1997   Maida
(Continued)

FOREIGN PATENT DOCUMENTS

EP       3077738 A1    10/2016
IN   4675CHENP2013 A    6/2016
(Continued)

OTHER PUBLICATIONS

PCT; App. No. PCT/US2019/031254; International Search Report and Written Opinion dated Jul. 11, 2019.
(Continued)

*Primary Examiner* — Emmanuel E Duke
(74) *Attorney, Agent, or Firm* — Fitch, Even, Tabin & Flannery LLP

(57) ABSTRACT

An optimal package structure and an amount of refrigerant to insert into the package structure are determined based upon product information, consumer preference information, and weather information. The optimal package structure and the amount of refrigerant are an optimized combination that is effective to both protect the product from damage and preserve the product from spoilage. A package is constructed to contain the product according to the optimal package structure and the amount of refrigerant is inserted into the structure.

20 Claims, 12 Drawing Sheets

Related U.S. Application Data

(60) Provisional application No. 62/671,786, filed on May 15, 2018.

(51) Int. Cl.
*B65B 57/00* (2006.01)
*B65B 5/02* (2006.01)

(52) U.S. Cl.
CPC .... *F25D 2303/084* (2013.01); *F25D 2600/06* (2013.01)

(58) Field of Classification Search
CPC . B65B 57/12; B65B 2210/04; B65B 2220/16; B65B 25/001; B65B 25/041; B65B 55/00; B65B 55/20; B65B 59/003; B65B 59/02; G06F 16/901; G06F 16/9035
See application file for complete search history.

(56) References Cited

U.S. PATENT DOCUMENTS

| | | |
|---|---|---|
| 6,596,124 B2 | 7/2003 | Hookham |
| 6,753,061 B1 | 6/2004 | Wedi |
| 7,337,706 B2 | 3/2008 | Shiraishi |
| 8,881,540 B1 | 11/2014 | Barakat |
| 8,938,986 B2 | 1/2015 | Matta |
| 9,248,611 B2 | 2/2016 | Divine |
| 9,400,966 B2 | 7/2016 | Dertadian |
| 9,497,982 B1 | 11/2016 | Sinz |
| 9,829,564 B2 | 11/2017 | Bruder |
| 2003/0136506 A1 | 7/2003 | Malone |
| 2004/0243353 A1 | 12/2004 | Aghassipour |
| 2006/0198931 A1 | 9/2006 | Neto |
| 2007/0028642 A1 | 2/2007 | Glade |
| 2007/0067177 A1 | 3/2007 | Martin |
| 2007/0172634 A1 | 7/2007 | Kobre |
| 2011/0029413 A1 | 2/2011 | Ben-Tzur |
| 2011/0114714 A1 | 5/2011 | Sullivan |
| 2012/0036875 A1 | 2/2012 | Yun |
| 2012/0197810 A1 | 8/2012 | Haarmann |
| 2013/0059097 A1 | 3/2013 | Prud'Homme |
| 2013/0171422 A1 | 7/2013 | De Luca |
| 2013/0289927 A1 | 10/2013 | Smith |
| 2014/0144161 A1 | 5/2014 | Pointer |
| 2014/0172513 A1 | 6/2014 | Maclean |
| 2014/0222521 A1 | 8/2014 | Chait |
| 2014/0222522 A1 | 8/2014 | Chait |
| 2014/0244289 A1 | 8/2014 | Lowenstein |
| 2014/0313055 A1 | 10/2014 | Warkentin |
| 2015/0096266 A1 | 4/2015 | Divine |
| 2015/0143823 A1 | 5/2015 | Slack |
| 2015/0153087 A1 | 6/2015 | Yamashita |
| 2015/0203297 A1 | 7/2015 | Manning |
| 2015/0343705 A1 | 12/2015 | Chen |
| 2016/0122043 A1 | 5/2016 | Divine |
| 2016/0138856 A1 | 5/2016 | Wilson |
| 2016/0152358 A1 | 6/2016 | Divine |
| 2016/0280403 A1 | 9/2016 | Colson |
| 2016/0325520 A1 | 11/2016 | Berger |
| 2017/0081067 A1* | 3/2017 | Aze .................... B65C 3/06 |
| 2017/0253354 A1 | 9/2017 | Colson |
| 2017/0341795 A1 | 11/2017 | Colson |
| 2017/0344114 A1 | 11/2017 | Osterhout |
| 2018/0197137 A1 | 7/2018 | High |
| 2019/0353417 A1 | 11/2019 | Jalali |

FOREIGN PATENT DOCUMENTS

| | | |
|---|---|---|
| KR | 1019970032570 A | 7/1997 |
| KR | 2019990030926 U | 7/1999 |
| KR | 200268818 Y1 | 3/2002 |
| WO | 2005062216 A1 | 7/2005 |
| WO | 2008064179 A3 | 5/2008 |
| WO | 2015027292 A1 | 3/2015 |
| WO | 2015077262 A1 | 5/2015 |
| WO | 2015077262 A9 | 5/2015 |
| WO | 2016151042 A1 | 9/2016 |
| WO | 2017201067 A1 | 11/2017 |

OTHER PUBLICATIONS

Style Arts; "Dunapack"; https://www.youtube.com/watch?v=FuQibs9o10o; published on Dec. 5, 2009; pp. 1-2.

USPTO; U.S. Appl. No. 16/401,281; Notice of Allowance dated Sep. 11, 2020; (pp. 1-9).

\* cited by examiner

| Matrix | | | | |
|---|---|---|---|---|
| | | Package Structure | | |
| | | High | Medium | Low |
| Refrigerant | High | 401 | 402 | 403 |
| | Medium | 404 | 405 | 406 |
| | Low | 407 | 408 | 409 |

*FIG. 4*

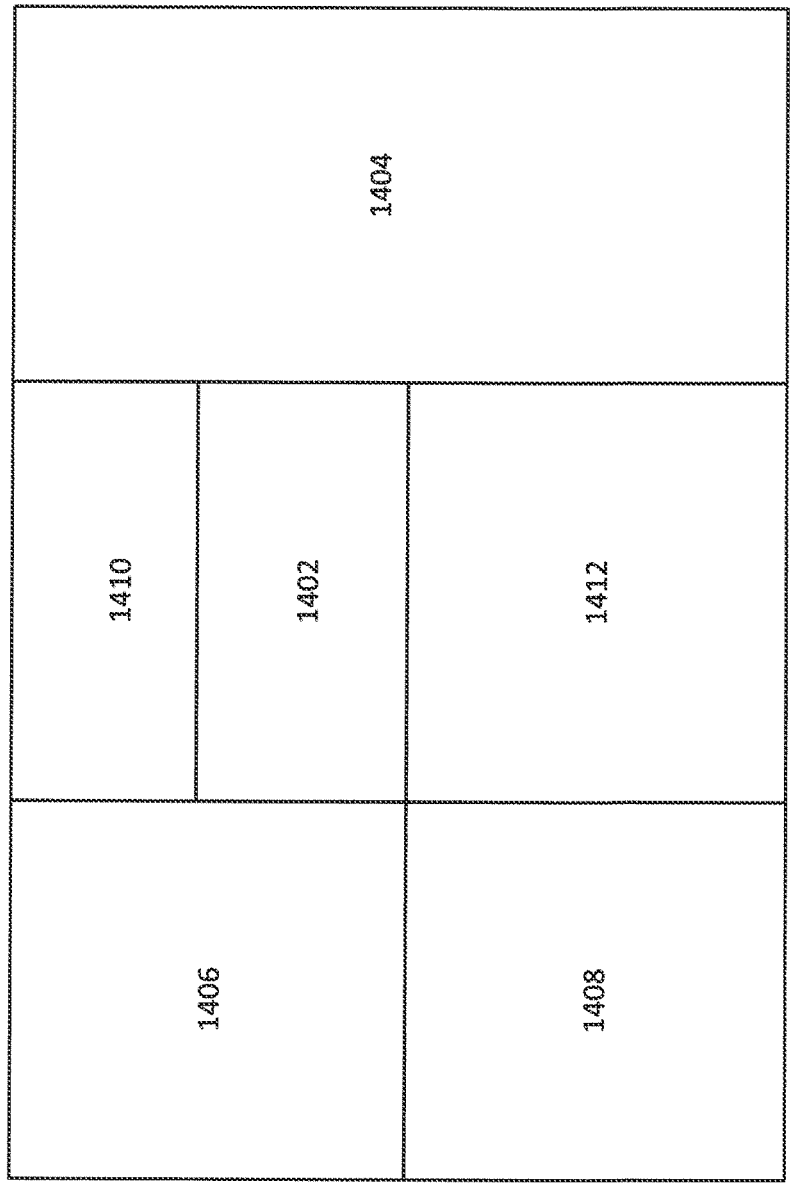

US 11,585,587 B2

SYSTEM AND METHOD FOR PACKAGE CONSTRUCTION

CROSS-REFERENCE TO RELATED APPLICATION

This application is a continuation of U.S. application Ser. No. 16/401,281, filed May 2, 2019, which claims the benefit of U.S. Provisional Application No. 62/671,786, filed May 15, 2018, both of which are incorporated herein by reference in their entireties.

TECHNICAL FIELD

These teachings relate to product packaging and, more specifically, to the shipping of frozen or chilled products from shipping sources to shipping destinations using packages that protect the product from damage and preserve the product from spoilage.

BACKGROUND

Various types of products are shipped from shipping sources (e.g., warehouses) to shipping destinations (e.g., homes of consumers). Some products that are shipped may need to be kept frozen (or chilled) during the shipping process in order to prevent the spoilage of these products. Additionally, many types of products typically need to be protected from damage occurring along the shipping route. To take two examples, pizza or ice cream may need to be kept frozen while being shipped as well as being protected from damage that might occur during the shipping process.

Standard-sized packages or boxes are often used to ship products. To prevent spoilage, these standard shipping containers sometimes include predetermined amounts of refrigerant materials that are used to cool the products. That is, the amount of such refrigerant materials cannot be varied. As for protection from damage, only standard protection structures are offered by these previous approaches.

Unfortunately, these previous approaches sometimes resulted in wasted packing materials and wasted amounts of refrigerant being used since the item may be, for example, much smaller than the shipping package, and not need as much of the provided refrigerant in order to be preserved. In other situations, the amount of refrigerant was too little, thereby allowing the product to spoil or otherwise become unusable before the product was delivered. In still other examples, the amount of refrigerant was adequate, but the structure of the package was inadequate to protect the product from damage that occurred to the package along the shipping route.

BRIEF DESCRIPTION OF THE DRAWINGS

The above needs are at least partially met through the provision of approaches that optimize the structure and amount of refrigerant in a package, wherein:

FIG. 4 comprises a diagram of aspects of a system as configured in accordance with various embodiments of these teachings;

FIG. 14 comprises a diagram of aspects of a system as configured in accordance with various embodiments of these teachings.

DETAILED DESCRIPTION

Figure 1:
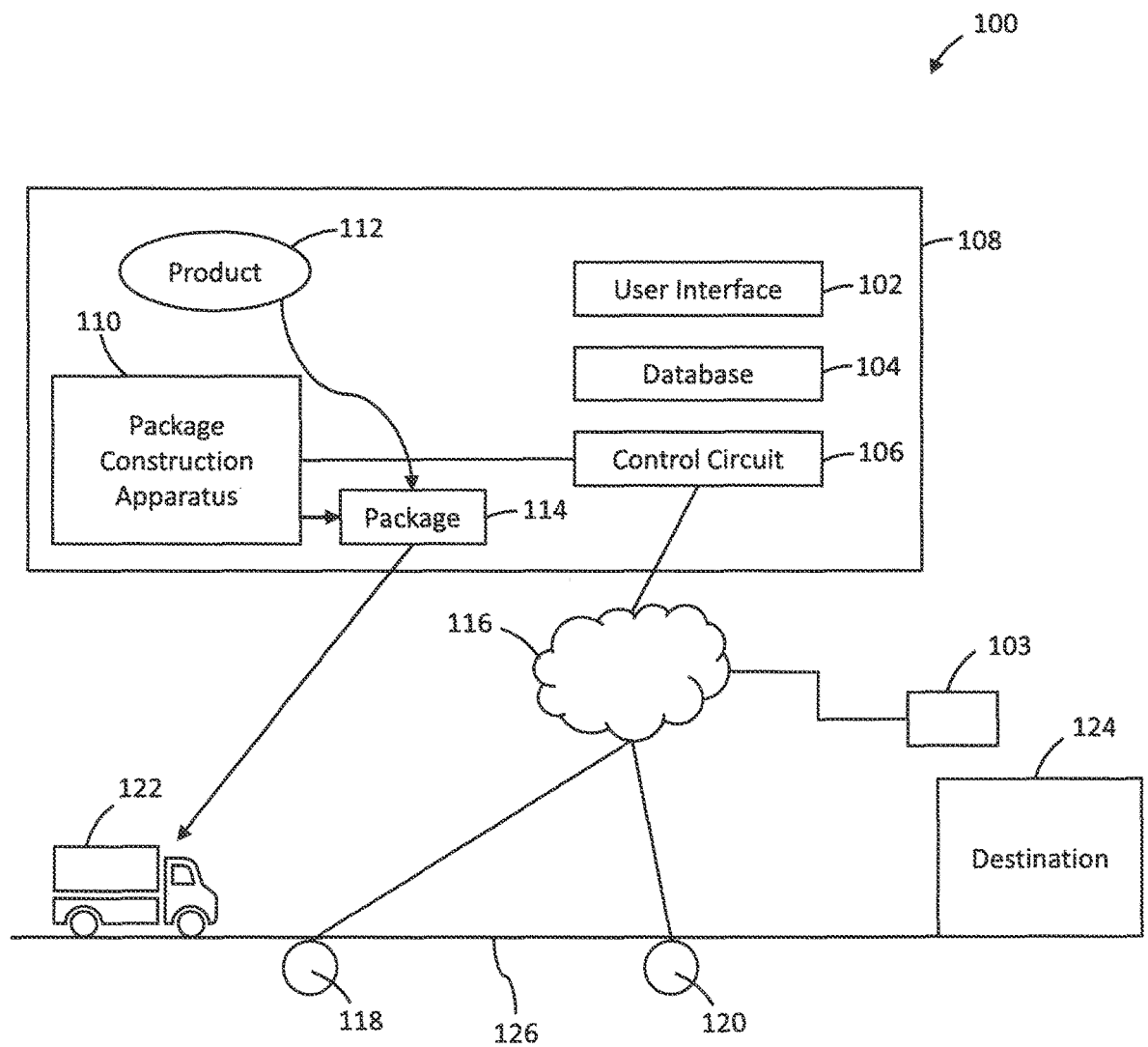
FIG. 1 comprises a diagram of a system as configured in accordance with various embodiments of these teachings.

Generally speaking, a system obtains various types of information including customer preferences about how the customer wants their product (e.g., a perishable product) delivered (e.g., time of day), physical characteristics of the product (e.g., dimensions or cold chain requirements), and/or the weather data along the delivery route (e.g., hot weather). Using this information, the package structure and amount of refrigerant placed in the product structure are dynamically optimized so as to both provide adequate protection for the product and to adequately cool or preserve the product during the shipping and delivery process.

In many of these embodiments, a system that is configured to optimize package structure and an amount of refrigerant for the shipment of refrigerated products includes a user interface, a database, at least one sensor, and a control circuit. The user interface is configured to receive consumer preference information from a customer. The customer preference information identifies one or more preferences of the customer concerning the timing or method of shipping a product from a shipping source to a shipping destination according to a delivery route. Other examples are possible.

The database is coupled to the user interface and is configured to store the customer preference information. The database is also configured to store product information. The product information may be physical characteristics or cooling requirements of the product. Other examples are possible.

The sensor is configured to obtain weather information concerning weather conditions occurring along the delivery route. For example, the sensor may obtain temperature, wind, pressure, or precipitation data relating to conditions occurring along the route.

The control circuit is coupled to the database, the user interface, and the at least one sensor. The control circuit is configured to determine an optimal package structure and an amount of refrigerant to insert into the package structure based upon the product information, the consumer preference information, and the weather information. The optimal package structure and the amount of refrigerant are selected so as to be an optimized combination that is effective to both protect the product from damage and preserve the product from spoilage.

The package construction apparatus is coupled to the control circuit. The package contraction apparatus is configured to construct a package to contain the product according to the optimal package structure and to insert the amount of refrigerant into the structure as determined by the control circuit.

In aspects, the optimized package structure is designed so as to optimize a thickness of the package or a shape of the package. Other characteristics may also be optimized. In some examples, the optimal package structure is a honeycomb configuration. In examples, the honeycomb configuration includes gaps into which the refrigerant is selectively inserted.

In other aspects, the optimal package structure includes a plurality of compartments to hold a plurality of products. That is, the overall package is divided into multiple compartments. The multiple compartments may have varying protection structures and varying amounts of refrigerant.

The products may be a wide variety of types of products. In examples, the product may be a frozen product, a refrigerated product, or a chilled product. Other examples of products are possible.

In some examples, the refrigerant is dry ice. Other examples of refrigerants (or combinations of refrigerant materials) may also be used.

The package construction apparatus can utilize a variety of different processes and can be configured in a number of different ways. In one example, the package construction apparatus utilizes a printing process to construct the package.

In still others of these examples, the physical characteristics of the product include product dimensions, product weights, product types, or cold chain requirements. Other examples are possible.

The package (or the components of the package) can be disassembled and re-used. For example, the walls of a first package (having a honeycomb structure) can be disassembled from the first package and re-assembled into new packages.

In others of these embodiments, consumer preference information is collected from a customer. The customer preference information identifies one or more preferences of the customer concerning the timing or method of shipping a product from a shipping source to a shipping destination according to a delivery route.

The customer preference information is stored in a database. The database also stores product information such as the physical characteristics or cooling requirements of the product. Weather information concerning weather conditions that occur along the delivery route is also collected.

An optimal package structure and an amount of refrigerant to insert into the package structure are determined based upon the product information, the consumer preference information, and the weather information. The optimal package structure and the amount of refrigerant are an optimized combination that is effective to both protect the product from damage and preserve the product from spoilage. A package is constructed to contain the product according to the optimal package structure and the amount of refrigerant is inserted into the structure.

Referring now to FIG. 1, one example of a system 100 that optimizes the strength of a package and the amount of refrigerant in the package is described. The system 100 includes a shipment center 108 (where packages are created and from which packages are shipped). The shipment center 108 may be associated with or included within a warehouse, distribution center, retail store, or some other stand-alone location. In other examples, the shipment center 108 may be located at a customer location (e.g., at a customer home, business, school, or office). The shipment center 108 may be disposed at or associated with other locations as well.

Various electronic and/or mechanical elements are disposed at the shipment center 108. More specifically, a first user interface 102, a database 104, a control circuit 106, and a package construction apparatus 110 (that constructs a package 114 into which a product 112 is inserted) are disposed at the shipment center 108. Once the product 112 is inserted into the package 114, the package 114 is placed into a delivery vehicle 122, which carries the package 114 along a delivery route 126 to a shipping destination 124. Sensors 118 and 120 are disposed along the delivery route 126. A network 116 is coupled to the sensors 118, 120, a second user interface 103 (located at the shipping destination 124), and the control circuit 106. The shipping destination 124 may be a retail store, customer's home, office, business, school, apartment building, or a distribution center to mention a few examples.

The first user interface 102 is an electronic device that allow a user to enter information such as product information. In addition, the product information can be downloaded from some other location (e.g., directly from a manufacturer). In examples, the first user interface 102 is included at or incorporated with a cellular phone, smart phone, personal computer, or laptop to mention a few examples. The first user interface 102 may be a touchscreen, keyboard, computer mouse, or a combination of these or other elements. In some aspects, the user interface 102 is or provides an electronic connection to an outside data source.

The second user interface 103 is disposed at or in the vicinity of the shipping destination 124 and allows a customer to enter their shipping preferences. In examples, the user interface 103 is disposed at or incorporated with a cellular phone, smart phone, personal computer, or laptop to mention a few examples. The second user interface 103 may be a touchscreen, keyboard, computer mouse, or a combination of these or other elements.

The database 104 is any type of memory storage device. In examples, the database 104 stores the customer preference information, the product information, and the weather information.

The control circuit 106 is coupled to the user interface 102, the database 104, the package construction apparatus 110, and the network 116 (possibly via a transceiver circuit that is disposed at the shipment center 108). It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 106 may be configured (for example, by using corresponding programming stored in a memory as will be well understood by those skilled in the art) to carry out one or more of the steps, actions, and/or functions described herein.

As mentioned, the package construction apparatus 110 constructs the package 114 into which a product 112 is inserted. The package 114 is constructed of any suitable material (e.g., cardboard, honeycomb, printed in layers, to mention a few examples). Packing materials may also be inserted into the package 114 and according to these approaches, the amount and positioning of the packing materials can also be adjusted, for example, to allow optimal cooling (e.g., by providing channels to circulate cold air within the package 114 and/or to provide structural protection).

The product 112 may be of any type, for example, a grocery product, dry goods, appliance, book, health care product, personal hygiene product, electronics, frozen, chilled, to mention a few examples. Other examples are possible.

The package construction apparatus 110 is any type of machine (or combination of machines) that constructs packages. In examples, the package construction apparatus 110 may be a device that uses a printing process to print layers of materials to construct the package 114. The package construction apparatus 110 receives the package design from the control circuit 106 and constructs a package according to this design. For example, the design may specify the thickness, length, width, depth, shape, and/or contours of the package. The amount of refrigerant is also received from the control circuit 106. The refrigerant may, in one example, be dry ice. Other examples of refrigerant are possible.

In some examples, the placement of the refrigerant within the package 114 may also be specified. For example, the refrigerant may be uniformly positioned throughout the package structure (e.g., in empty voids or spaces in the package structure). In other examples, the refrigerant may be positioned closely to the product 112, while portions of the package 114 further away from the product may have little or no refrigerant.

The network 116 is any network or combination of electronic networks such as the internet, computer networks, wide area networks, local area networks, Wi-Fi networks, or any other type of electronic network. The network 116 allows information to be received at the control circuit 106 from the second user interface 103, and sensors 118 and 120.

The sensors 118 and 120 are any type of sensors that collect weather data. For example, the sensors 118 and 120 may be or include thermometers (to measure temperature), or pressure sensors (to sense atmospheric pressure). Other examples of sensors that obtain other types of measurements or values are possible.

The vehicle 122 is any type of vehicle (e.g., aerial drone, automated ground vehicle, car, truck, train, or ship) that can be utilized to deliver packages. The delivery route 126 is any delivery route or path (e.g., roads, bridges, railroad tracks, or combinations of these and other paths that allow traversing by the vehicle 122).

In one example of the operation of the system of FIG. 1, the first user interface 102 and/or second user interface 103 are configured to receive consumer preference information from a customer. The user interface 102 may allow information to be entered at the shipment center 108. The second user interface 103 may be utilized when the customer is at a remote site such as the shipping destination 124 (or some other location). This information may be sent to the shipment center 108 via the network 116.

The database 104 stores the customer preference information, the product information, and the weather information.

The control circuit 106 is configured to determine an optimal package structure and an amount of refrigerant to insert into the package structure based upon the product information, the consumer preference information, and the weather information. The optimal package structure and the amount of refrigerant are selected so as to be an optimized combination that is effective to both protect the product 112 from damage and preserve the product 112 from spoilage.

The package contraction apparatus 110 is configured to construct the package 114 to contain the product 112 according to the optimal package structure and to insert the amount of refrigerant into the structure as determined by the control circuit 106.

Figure 2:
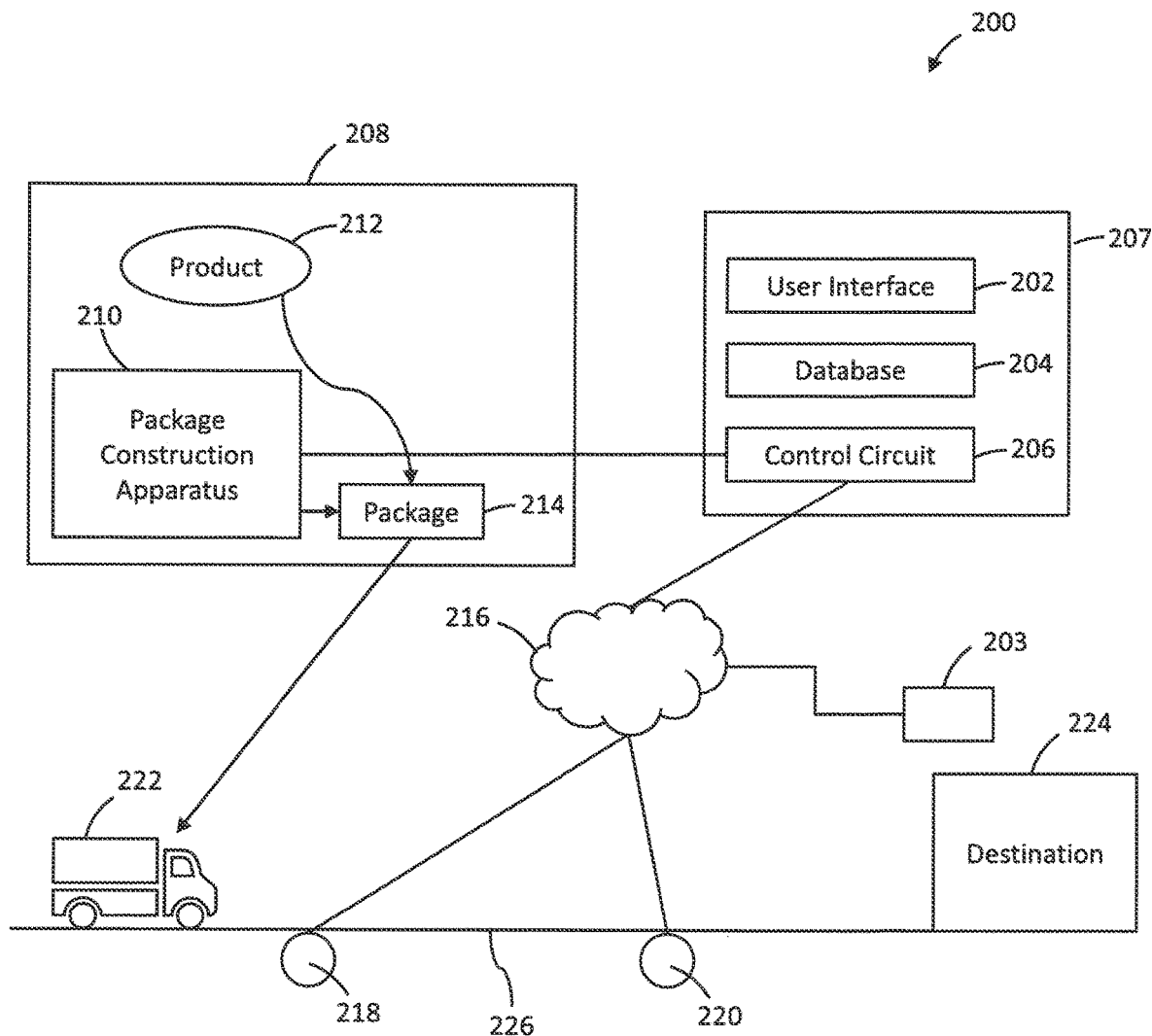
FIG. 2 comprises a diagram of a system as configured in accordance with various embodiments of these teachings.

Referring now to FIG. 2, another example of a system 200 that optimizes the strength of a package and the amount of refrigerant in the package is described.

The system 200 includes a central processing center 207 (including a first user interface 202, a database 204, and a control circuit 206) and a shipment center 208. The central processing center may be at any centralized location such as a headquarters or home office. The shipment center 208 (where packages are created and from which the packages are shipped) may be associated with or included within a warehouse, distribution center, or retail store. In other examples, the shipment center 208 may be located at a customer location (e.g., at a customer home, business, school, or office). The shipment center 208 may be disposed at other locations as well.

At the shipment center 208 is disposed a package construction apparatus 210 that constructs a package 214 into which a product 212 is inserted. Once the product 212 is inserted into the package 214, the package is placed into a delivery vehicle 222, which carries the package 214 along a delivery route 226 to a shipping destination 224. Sensors 218, 220 are disposed along the delivery route 226. A network 216 is coupled to the sensors 218, 220, a second user interface 203, the package construction apparatus 210, and the control circuit 206.

A difference between the example of FIG. 1 and the example of FIG. 2 is that different system elements are disposed at different locations. More specifically, in the example of FIG. 1, the first user interface, database, control circuit and package construction apparatus are disposed at a shipping center. On the other hand, in the example of FIG. 2, the first user interface, database, and control circuit are disposed at a central processing center, and the package construction apparatus is disposed at a remote shipping center. It will be appreciated that these are only two examples of the disposition of various system components and that other dispositions are possible.

The first user interface 202 is an electronic device that allows a user to enter information such as product information. In addition, the product information can be downloaded from some other location (e.g., directly from a manufacturer). In examples, the first user interface 202 is included at or incorporated with a cellular phone, smart phone, personal computer, or laptop to mention a few examples. The first user interface 202 may be a touchscreen, keyboard, computer mouse, or a combination of these or other elements. In some aspects, the first user interface 202 is an electronic connection to an outside data source.

The second user interface 203 is disposed at or in the vicinity of the shipping destination 224 and allows a customer to enter their shipping preferences. In examples, the second user interface 203 is included at or incorporated with a cellular phone, smart phone, personal computer, or laptop to mention a few examples. The second user interface 203 may be a touchscreen, keyboard, computer mouse, or a combination of these or other elements.

The database 204 is any type of memory storage device. In examples, the database 204 stores the customer preference information, the product information, and the weather information.

The control circuit 206 is coupled to the first user interface 202, the database 204 and the network 216 (possibly via a transceiver circuit that is disposed at the shipment center 208). It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 206 may be configured (for example, by using corresponding programming stored in a memory as will be well understood by those skilled in the art) to carry out one or more of the steps, actions, and/or functions described herein.

As mentioned, the package construction apparatus 210 constructs the package 214 into which a product 212 is inserted. The package 214 is constructed of any suitable material (e.g., cardboard, honeycomb, printed in layers, to mention a few examples). Packing materials may also be inserted into the package 214 and according to these approaches, the amount and positioning of the packing materials can also be adjusted, for example, to allow optimal cooling (e.g., by providing channels to circulate cold air within the package 214 and/or to provide structural protection).

The product 212 may be of any type, for example, a grocery product, dry goods, appliance, book, health care product, personal hygiene product, electronics, frozen, chilled, to mention a few examples. Other examples are possible.

The package construction apparatus 210 is any type of machine (or combination of machines) that constructs packages. In examples, the package construction apparatus 210 may be a device that uses a printing process to print layers of materials to construct the package 214. The package construction apparatus 210 receives the package design from the control circuit 206 and constructs a package according to this design. For example, the design may specify the thickness, length, width, depth, shape, and/or contours of the package. The amount of refrigerant is also received from the control circuit 206. The refrigerant may, in one example, be dry ice. Other examples of refrigerant are possible.

In some examples, the placement of the refrigerant within the package 214 may also be specified. For example, the refrigerant may be uniformly positioned throughout the package structure (e.g., in empty voids or spaces in the package structure). In other examples, the refrigerant may be positioned closely to the product 212, while portions of the package 214 further away from the product may have little or no refrigerant.

The network 216 is any network or combination of electronic networks such as the internet, computer networks, wide area networks, local area networks, Wi-Fi networks, or any other type of electronic network. The network 216 allows information to be received at the control circuit 206 from the second user interface 203, and sensors 218 and 220. The network 216 also connects the control circuit 206 with the package construction apparatus 210.

The sensors 218 and 220 are any type of sensors that collect weather data. For example, the sensors 218 and 220 may be or include thermometers (to measure temperature), or pressure sensors (to sense atmospheric pressure). Other examples of sensors are possible.

The vehicle 222 is any type of vehicle (e.g., aerial drone, automated ground vehicle, car, truck, train, or ship) that can be utilized to deliver packages. The delivery route 226 is any delivery route or path (e.g., roads, bridges, railroad tracks, or combinations of these and other paths that allow traversing by the vehicle 222).

In one example of the operation of the system of FIG. 2, the first user interface 202 and/or second user interface 203 are configured to receive consumer preference information from a customer. The first user interface 202 may allow information to be entered at the shipment center 208. The second user interface 203 may be utilized when the customer is at a remote site such as the shipping destination 224. This information may be sent to the shipment center 208 via the network 216.

The database 204 stores the customer preference information, the product information, and the weather information.

The control circuit 206 is configured to determine an optimal package structure and an amount of refrigerant to insert into the package structure based upon the product information, the consumer preference information, and the weather information. The optimal package structure and the amount of refrigerant are selected so as to be an optimized combination that is effective to both protect the product 212 from damage and preserve the product 212 from spoilage.

The package contraction apparatus 210 is configured to construct the package 214 to contain the product 212 according to the optimal package structure and to insert the amount of refrigerant into the structure as determined by the control circuit 206.

Figure 3:
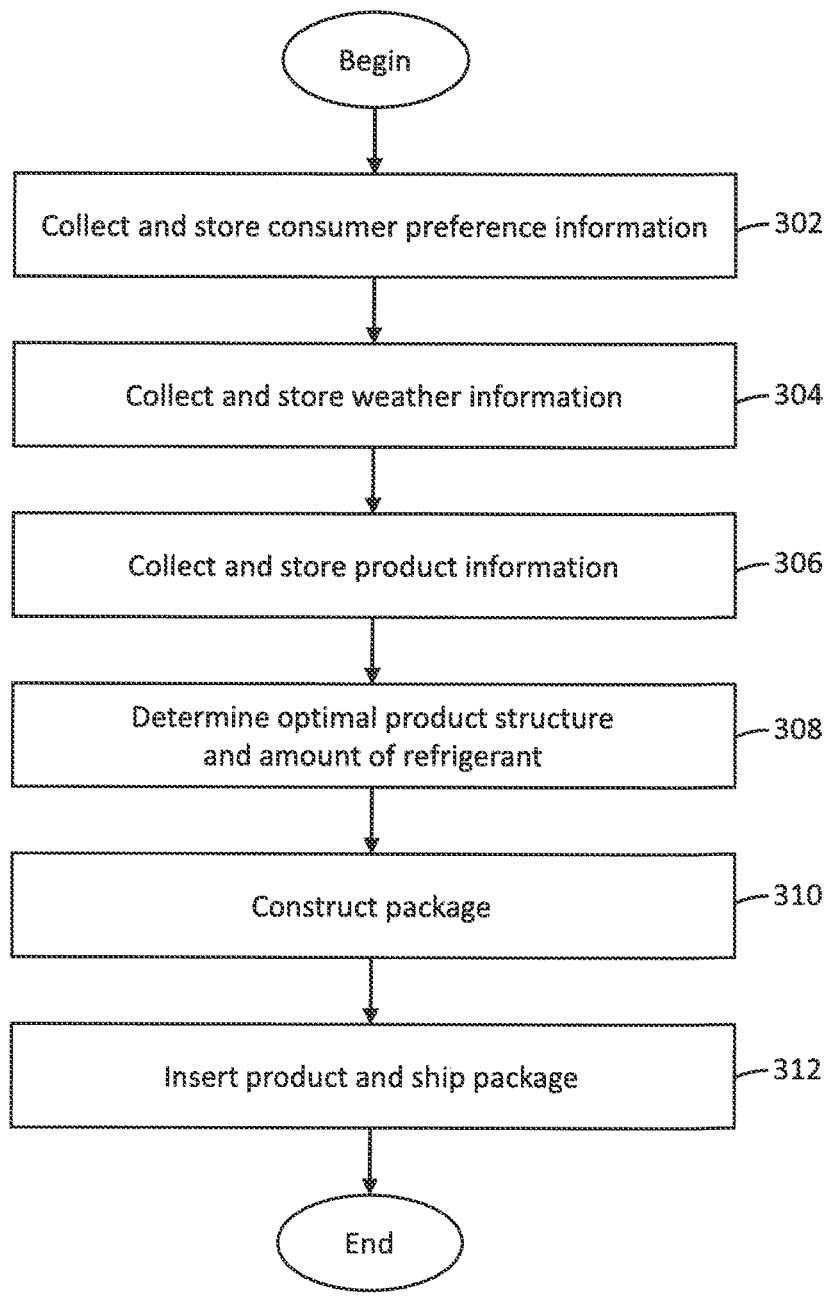
FIG. 3 comprises a flowchart as configured in accordance with various embodiments of these teachings.

Referring now to FIG. 3, one example of an approach that creates an optimal package design, which optimizes the strength of a package and the amount of refrigerant in the package is described. At step 302, consumer preference information is collected from a customer and stored in a database. The customer preference information identifies one or more preferences of the customer concerning the timing or method of shipping a product from a shipping source to a shipping destination according to a delivery route (e.g., next day air delivery).

At step 304, weather information concerning weather conditions occurring along the delivery route is collected and stored in the database. The weather information may be obtained by various sensors that are deployed along the delivery route. For example, the sensors may be thermometers, wind speed measurement devices, or barometric pressure sensors. Other types of sensors are possible.

At stop 306, product information is stored in the database. The product information is physical characteristics or cooling requirements of the product. In aspects, the product information may be electronically downloaded from a manufacturer, distributor, or other source.

At step 308, an optimal package structure and an amount of refrigerant to insert into the package structure are determined based upon the product information, the consumer preference information, and the weather information. The optimal package structure and the amount of refrigerant is an optimized combination that is effective to both protect the product from damage and preserve the product from spoilage.

At step 310, a package is constructed to contain the product according to the optimal package structure and inserting the amount of refrigerant into the structure. Various types of machines can be used to contract the package. For example, package printing approaches well known to those skilled in the art can be utilized. The machines receive the package structure and convert this information or instructions (i.e., specifying the package design) into physical actions that are effective to build or construct a corresponding package. Additionally, the machines receive instructions as to the amount of refrigerant to insert and are configured to insert this amount of refrigerant into the package structure. In further aspects, the machines may receive instructions that specify the location in the package structure where the refrigerant is to be inserted.

At step 312, the product is inserted into the package and shipped. The shipment may be made via any type of delivery vehicle such as a car, truck, train, or ship to mention a few examples.

Referring now to FIG. 4, one example of an approach for mapping products to protection levels is described. A matrix 452 is divided into columns 454 and rows 456. The columns 454 represent structural protection offered by the product and are divided into high, medium, and low. By "high" protection, it is meant the product is extremely breakable and susceptible to damage and that the maximum amount of protection should be used. By "medium" protection, it is meant that the product still needs some protection and may be susceptible to damage, but that the structural protection need not be maximized. In other words, a moderate amount of protection is needed. By "low" protection, it is meant that a minimal amount of protection is needed. In other words, little or no protection is needed (other than a box to enclose the product) for the product to reach the destination.

The rows 456 represent the amount of refrigeration provided by the package and are divided into high, medium, and low. By a "high" amount, it is meant the product is extremely susceptible to spoilage and (potentially) extra refrigerant is needed to keep the product cold enough so that it will be preserved when being transported to the shipping destination. By a "medium" amount, it is meant that a moderate amount of refrigerant is needed. Although the amount of refrigerant is not maximized, some amount of refrigerant is still needed. By a "low" amount, it is meant that little or no refrigerant is needed to preserve the product when it is shipped to the destination.

The matrix 452 consists of cells 401, 402, 403, 404, 405, 406, 407, 408, and 409. Each cell corresponds to a row and column, and consequently a level of structural protection and amount of refrigeration provided. For instance, cell 401 represents products needing packages that offer high structural protection and provide high amounts of refrigeration. Each of the cells is suitable for different types of product.

Cell 401 is for products such as chocolate covered ice cream products (e.g., Christmas tree shaped chocolate products). Cell 402 represents products such as frozen fruit. Cell 403 is for products such as frozen meat.

Cell 404 is for products such as cooked appetizers. Cell 405 represents products such as frozen vegetables. Cell 406 is for products such as blocks of cheese.

Cell 407 is for products such as ordinary ice cream (e.g., not covered by chocolate). Cell 408 represents products such as refrigerated meat. Cell 409 is for products such as frozen juice concentrate.

It will be appreciated that these are examples only, and that other examples are possible. It can be seen that a product type may be determined, mapped to a particular cell, and then an appropriate package constructed for the product.

Referring now collectively to FIGS. 5-9, one example of the implementation of these approaches is described.

Figure 5:
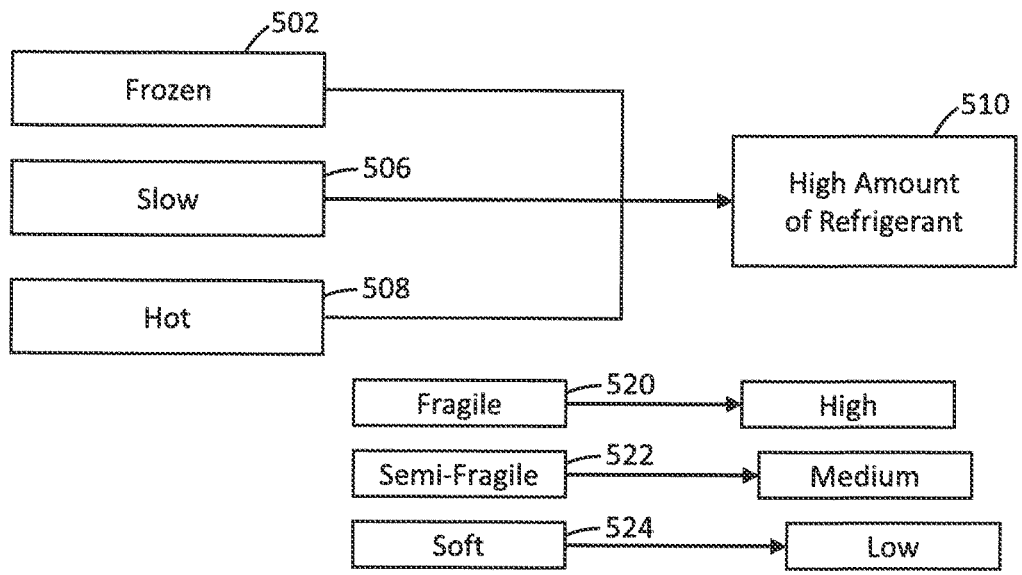
FIG. 5 comprises a diagram of aspects of a system as configured in accordance with various embodiments of these teachings.

Referring especially now to FIG. 5, one example of how product information, customer preference information, and weather information is mapped into an amount of refrigerant to be inserted into a package is described. As shown in this example, product information 502, customer preference information 506, and weather (temperature along the route) information 508 is received or obtained. In this case, the product information 502 indicates that the product is frozen. The customer preference information 506 indicates that the customer desires a slow delivery speed (e.g., more than X-day delivery time frame, where X is an integer value). The weather information 508 indicates the temperature along the route is hot (greater than 90 degrees Fahrenheit). Given these inputs, a refrigerant amount 510 is obtained indicating a high amount of refrigerant is needed.

It will be appreciated that this is only one example of a mapping. Other inputs will potentially produce different amounts (e.g., low or medium) amounts of refrigerant. Moreover, the terms high, medium, and low map to numerical values. For instance, "high" may always map to a first predetermined amount of refrigerant, "medium" to a second predetermined amount of refrigerant, and "low" may map to a third predetermined amount of refrigerant. By "amount," it is meant volume, weight, mass or any other characteristic that describes how much refrigerant is to be inserted or used with the package. It will also be understood that more than three amount levels (e.g., high, medium, and low) may be used. For example, an equation may be utilized that assigns points to input, and inputs entered into this equation, which yields an amount of refrigerant.

Returning to FIG. 5, an example of a mapping that determines the degree of protection to be offered by the package is described. In a first mapping 520, a product that has been classified as "fragile" is mapped to a package with a high package strength. In a second mapping 522, a product that has been classified as "semi-fragile" is mapped to a package with a medium package strength. In a third mapping 524, a product that has been classified as "soft" is mapped to a package with a low package strength.

It will be appreciated that "high," "medium," and "low" package strength structures may be defined according to a variety of different characteristics. For example, each of these characterizations may be associated with a predetermined package thickness, a package with a certain structure (e.g., honeycomb structure), or package constructed of a particular material (e.g., cardboard).

Figure 6:
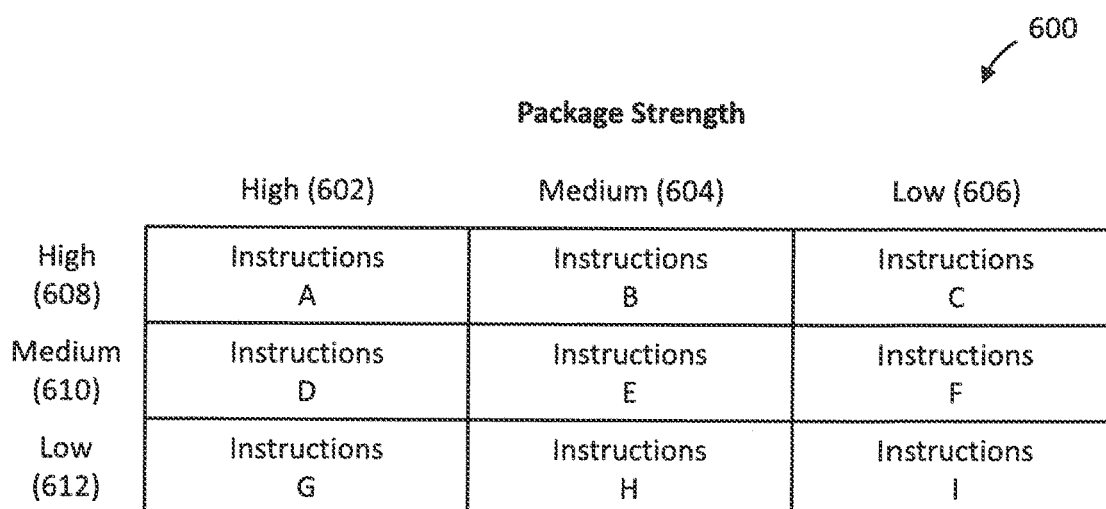
FIG. 6 comprises a diagram of aspects of a system as configured in accordance with various embodiments of these teachings.

Referring now to FIG. 6, one example of a mapping from (1) the desired amount of refrigerant, and (2) the desired package strength to a particular package design is described. The desired amount of refrigerant and the desired package strength may be determined according to the approach of FIG. 5. These values are mapped to a particular package design that is created by specific sets of instructions.

In one example, once the amount of refrigerant and amount of structural protection are determined, a table or matrix 600 maps these values to different groups of computer instructions that are executed by a machine to create the package. For instance, the instructions may create a package of certain dimensions that depend upon the height, length, width, and/or shape of the product. The package may have a wall thickness that depends upon the amount of protection (e.g., high, medium, or low) that is desired. The package may have an amount of refrigerant inserted that depends upon the amount of cooling needed. The instructions may be computer implemented instructions (e.g., computer code) that is utilized by a machine that actually creates the package.

It will be appreciated that instead of selecting a particular group of instructions, a predetermined package design may be determined. More specifically, once the amount of refrigerant and amount of structural protection for the package are determined, the table 600 may map directly to a predetermined package design, with the package having predetermined dimensions (e.g., height, length, width, and wall thickness) and having a predetermined amount of refrigerant in a predetermined distribution pattern.

As shown in the mapping table 600, package strengths 602, 604, and 606 and amount of refrigerants 608, 610, and 612 are mapped to different instructions (Instructions A, B, C, D, E, F, G, H, and I that are shown in the various cells of the table 600). For example, a high package strength 602 and a high amount of refrigerant 608 map to Instructions A. Once the instructions are selected, then these are executed to determine a pattern, design, or plan for the package. The plan is sent to a machine that constructs the package according to the design or plan. The instructions may use values of various parameters stored in memory, such as the parameters illustrated in FIG. 7.

Figure 7:
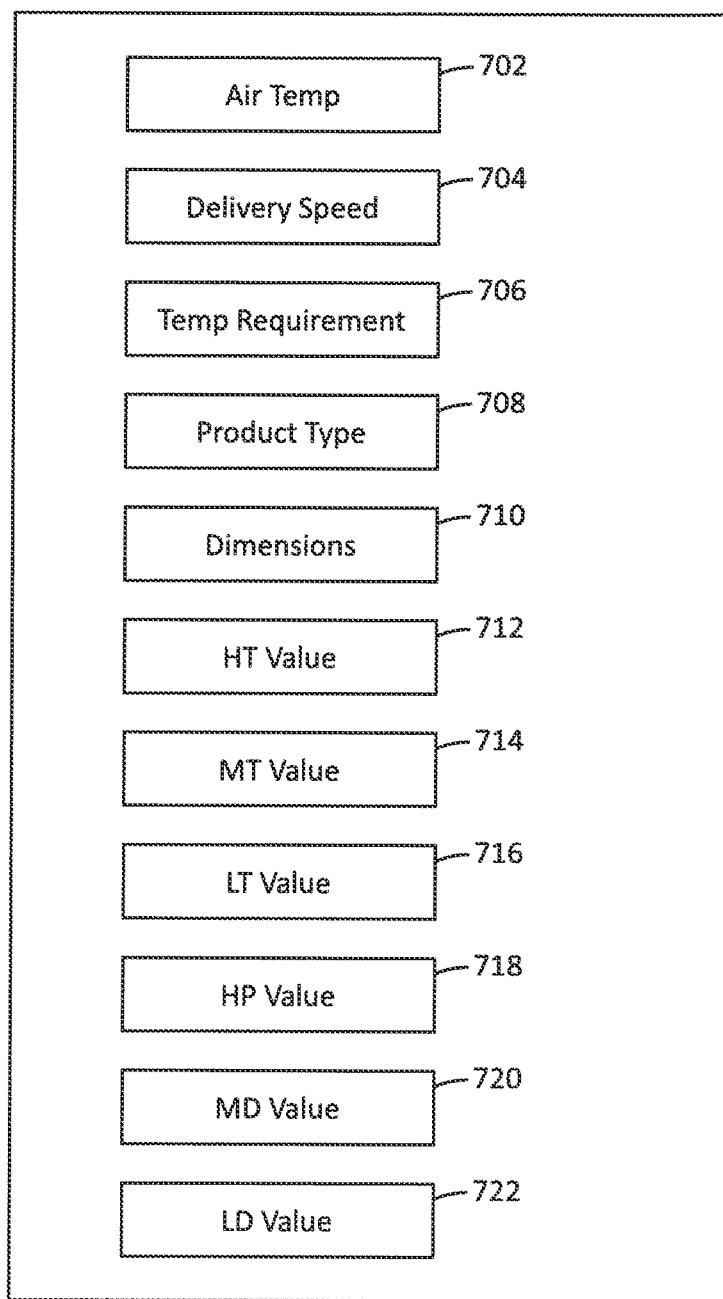
FIG. 7 comprises a diagram of aspects of a system as configured in accordance with various embodiments of these teachings.

Referring now to FIG. 7, one example of a memory structure 700 is described. The memory structure 700 includes an air temperature 702, a delivery speed 704, a temperature requirement 706, a product type 708, dimensions 710, a high package thickness (HT) value 712, a medium package thickness (MT) value 714, a low package thickness (LT) value 716, a high density (HD) refrigerant value 718, a medium density (MD) refrigerant value 720, and a low density (LD) refrigerant value 722. These values are obtained from different sources, stored in the memory, and used to determine a package design.

The air temperature 702 is the air temperature as measured by the delivery vehicle. The air temperature 702 may be obtained by sensors along a delivery route.

The delivery speed 704 is the delivery speed selected by the customer. For example, the delivery speed may be set to be fast, normal, or slow. Fast may mean overnight, normal may be 1-3 business days, and slow may mean greater than 3 business days in some examples.

The temperature requirement 706 may specify cold chain requirements for the product. For example, the product may be required to be kept at or below a predetermined temperature.

The product type 708 may be a specific product type such as frozen vegetables or cooled beverage. The dimensions 710 may be the physical dimensions of the product, including overall product dimensions. In some examples, the dimensions 710 are exact dimensions that include or define the product shape. The dimensions can be of any convenient measurement unit.

The high package thickness (HT) value 712, medium package thickness (MT) value 714, and low package thickness (LT) value 716 are numerical values (that can be adjusted) of package wall thicknesses. These values can be of any convenient measurement unit.

The high density (HD) refrigerant value 718, medium density (MD) refrigerant value 720, and low density (LD) refrigerant value 722 are density values of refrigerant that is to be inserted into the package.

Figure 8:
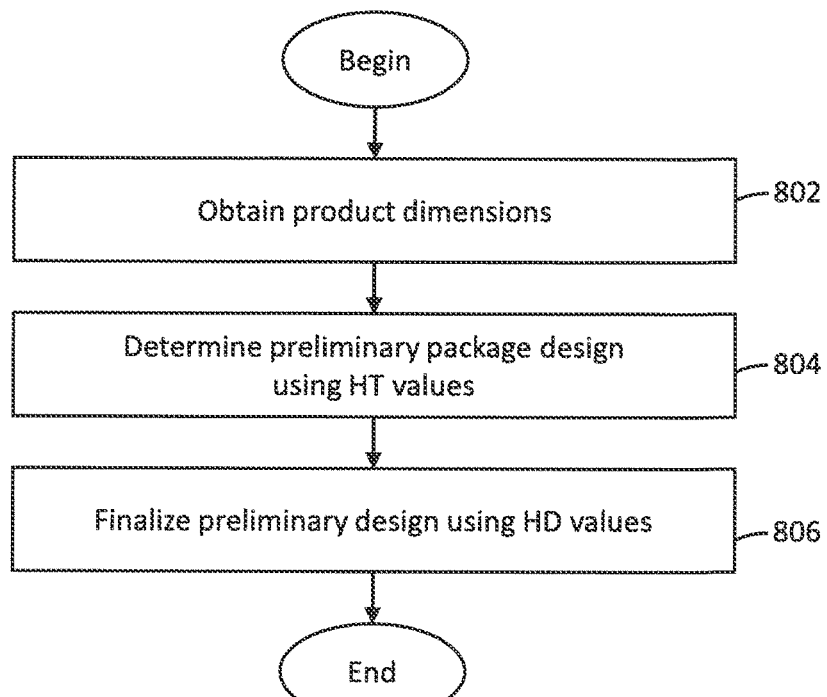
FIG. 8 comprises a flowchart as configured in accordance with various embodiments of these teachings.

Referring now to FIG. 8, one example of an instruction set is described. FIG. 8 represents "Instructions A" from the table 600 of FIG. 6.

At step 802, product dimensions may be obtained. The product dimensions may be the length, width, and depth (or thickness) of the product. Additionally, the shape of the product may be considered as defined by the dimensions. For example, the dimensions may not only define straight lines, but non-rectangular shapes such as various types of curves. To take one example, the dimensions of a bottle of orange juice may be overall dimensions of the bottles (e.g., length, width, and thickness). However, in other aspects, the dimensions may specify the exact shape (e.g., including the curves) of the bottle. In other words, these dimensions would include overall dimensions, and also include dimensions and locations for curves in the bottle design, places where the thickness of the bottle varied (e.g., the bottle is thicker on bottom than on the top).

At step 804, a preliminary package design is obtained according to the product dimensions and with a honeycomb structure with a high thickness (HT). HT may be set to a predetermined value, for example, in inches or centimeters. In aspects, the HT value may be the high package thickness (HT) value 712. The preliminary package design may be of a standard shape or designed to fit the shape and contours of the product.

At step 806, the preliminary design is finalized by determining an amount and pattern of refrigerant (e.g., dry ice) to be inserted into the package structure. The refrigerant is inserted with a high density (HD) configuration. In aspects, the high density (HD) refrigerant value 718 of FIG. 7. The HD value may be set to some numerical value, such as the amount of refrigerant in a cubic volume of space. For example, the HD value may be set to fill all empty spaces in the honeycomb structure or a predetermined number of spaces in the honeycomb structure (e.g., 80 percent of the volume of the structure).

The refrigerant may also be selectively spaced within the package based upon product type (e.g., according to the product type 708). For instance, a bottle of orange juice may be shipped and the refrigerant may be placed in the spaces of the honeycomb structure that are immediately adjacent to the bottle. In another example, the density of refrigerant may be varied in the package. For example, a first density of refrigerant may be deposited in areas or volumes immediately adjacent to the product, but a second (and lower) density deposited in areas or volumes that are not immediately adjacent to the product. The first and second densities may take on various values (including zero for the second density) as long as the first density is greater than the second density.

The result of completing step 806 is a final product design. The final product design may be in any electronic form such as a data structure, computer instructions, a script, or some combinations of these elements.

Figure 9:
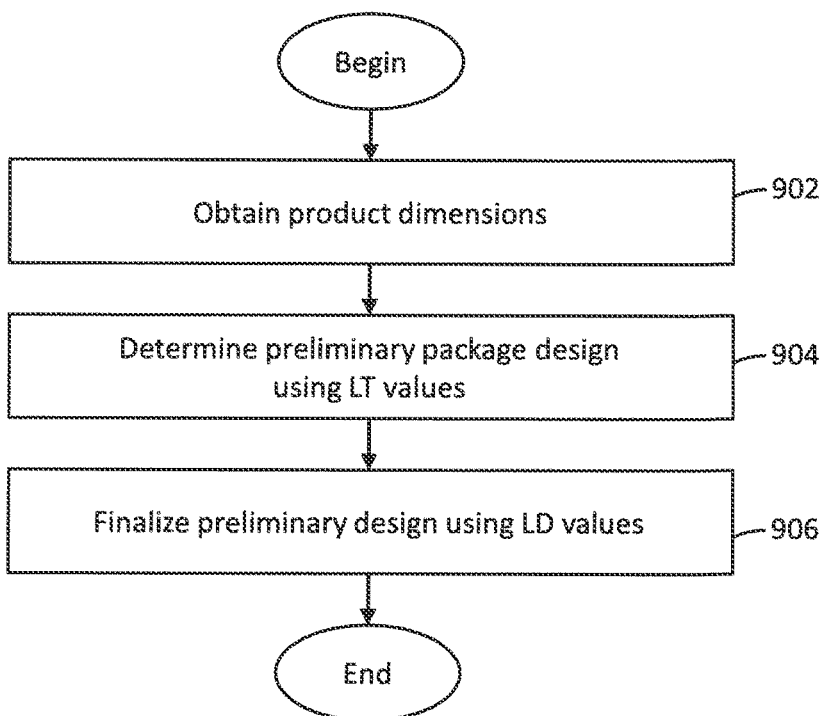
FIG. 9 comprises a flowchart as configured in accordance with various embodiments of these teachings.

Referring now to FIG. 9, another example of an instruction set is described. FIG. 9 represents "Instructions I" from the table of FIG. 6.

At step 902, product dimensions may be obtained. The product dimensions may be the length, width, and depth (or thickness) of the product. Additionally, the shape of the product may be considered as defined by the dimensions. As with the example of FIG. 8, the dimensions may not only define straight lines, but include non-rectangular shapes such as shapes with various types of curves.

At step 904, a preliminary package design is obtained according to the product dimensions and with a honeycomb structure with a low thickness (LT). LT may be set to a predetermined value, for example, in inches or centimeters. In aspects, the LT value may be the low package thickness (LT) value 716.

At step 906, the preliminary design is finalized by determining an amount and pattern of refrigerant (e.g., dry ice) to be inserted into the package structure. The refrigerant is inserted with a low density (LD) configuration. In aspects, the low density (LD) refrigerant value 722 of FIG. 7. The LD value may be set to some numerical value, such as the amount of refrigerant in a cubic volume of space. For example, the LD value may be set to fill all empty spaces (with a small amount of refrigerant) in the honeycomb structure or a predetermined number of spaces in the honeycomb structure (e.g., 20 percent of the volume of the structure with a higher amount of refrigerant in each space). As with the example of FIG. 8, the refrigerant may also be selectively spaced within the package based upon product type (e.g., according to the product type 708 or dimensions).

The result of completing step 906 is a final product design. The final product design may be in any electronic form such as a data structure, computer instructions, a script, or some combinations of these elements.

Figure 10:
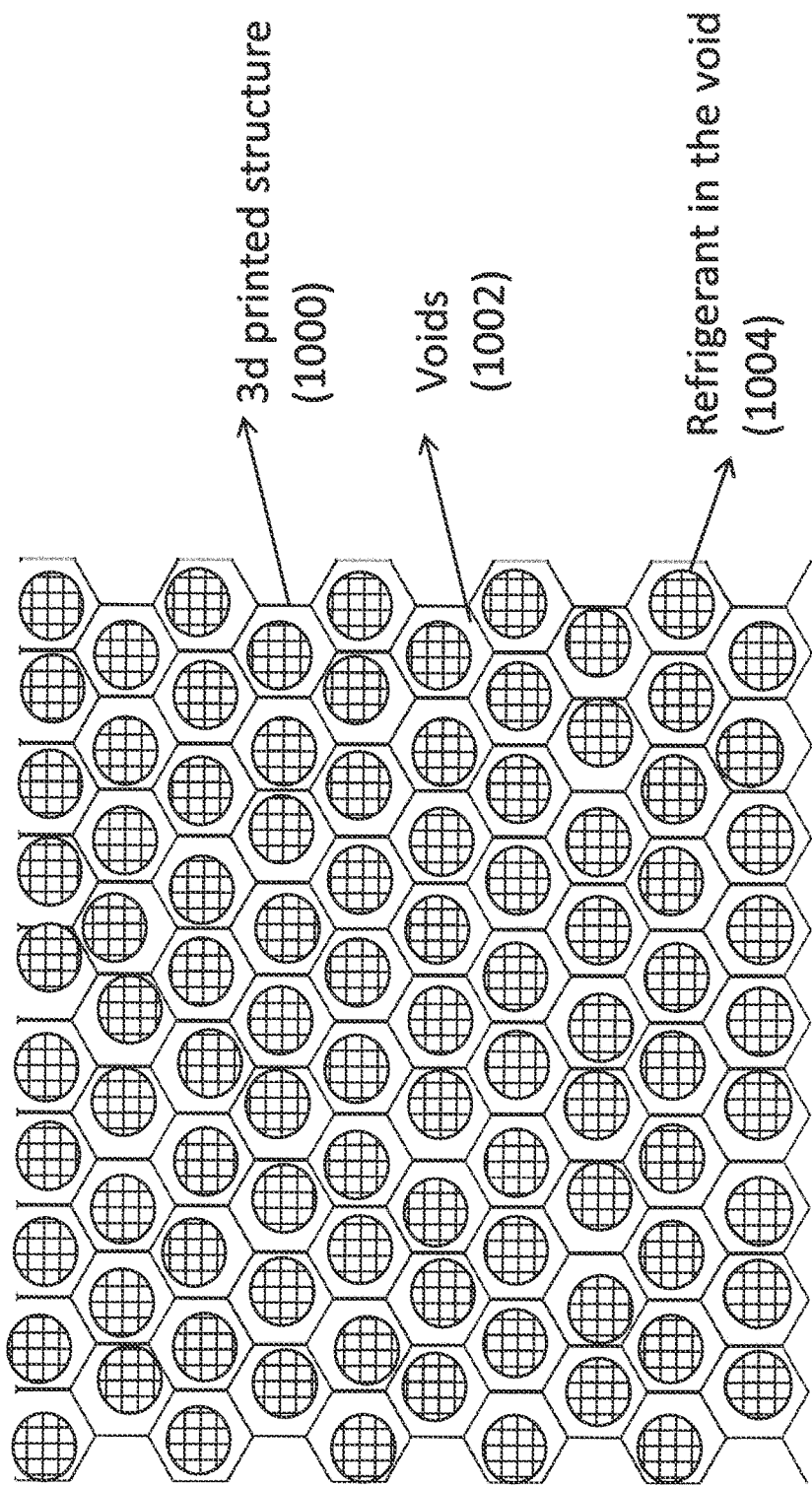
FIG. 10 comprises a diagram of aspects of a system as configured in accordance with various embodiments of these teachings.

Referring now to FIG. 10, one example of a package design with a high density of refrigerant incorporated into the design is described. The package design comprises a honeycomb structure 1000 with void volumes 1002 separated by walls. Refrigerant (e.g., dry ice) 1004 is inserted into the void volumes 1002. Since the example of FIG. 10 is a design with high amounts of refrigerant 1004, all the void volumes 1002 have refrigerant 1004 inserted.

Figure 11:
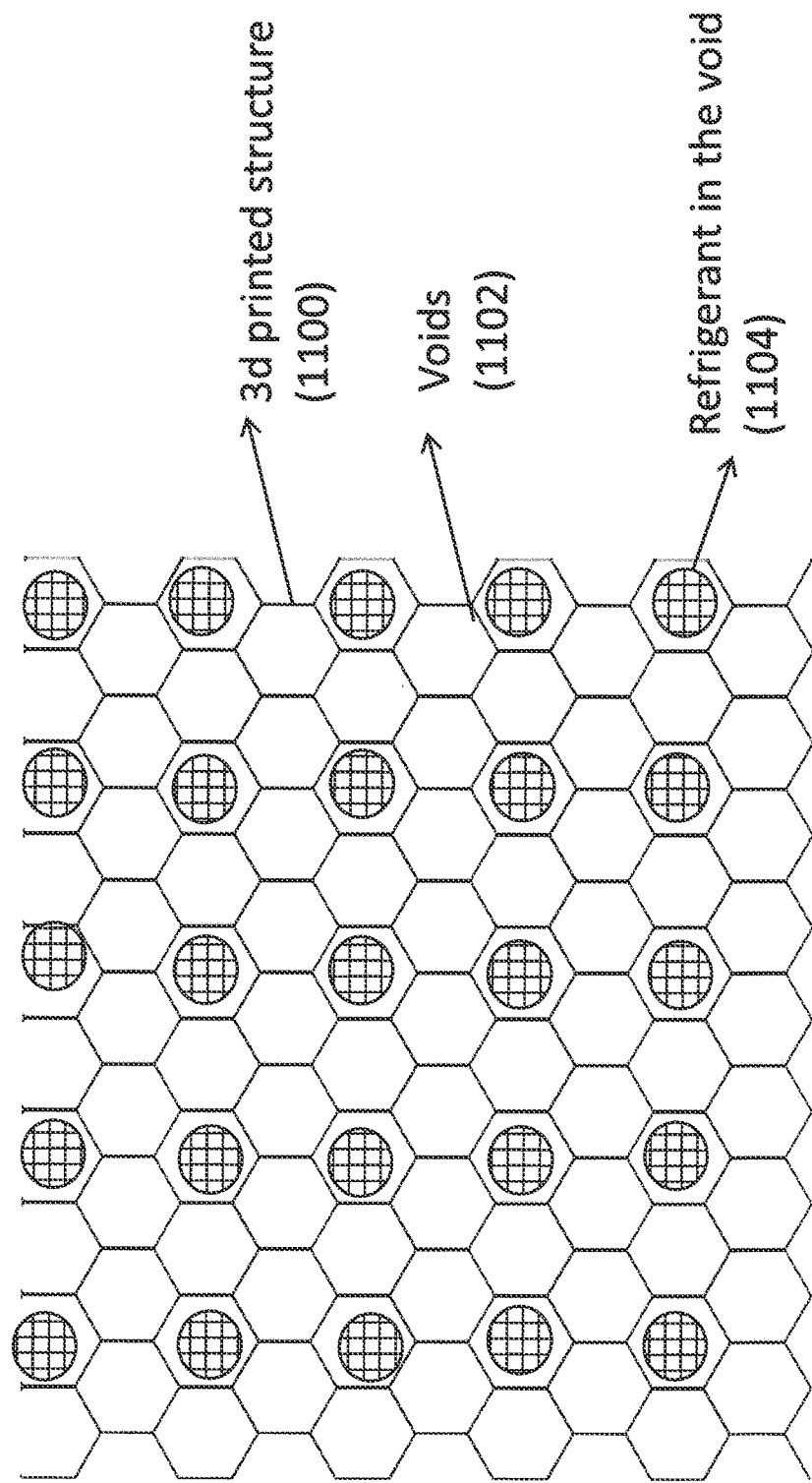
FIG. 11 comprises a diagram of aspects of a system as configured in accordance with various embodiments of these teachings.

Referring now to FIG. 11, one example of a package design with a medium density of refrigerant incorporated into the design is described. The package design comprises a honeycomb structure 1100 with void volumes 1102 separated by walls. Refrigerant (e.g., dry ice) 1104 is inserted into the void volumes 1102. Since the example of FIG. 11 is a design with medium amounts of refrigerant 1104, only some of the void volumes 1102 (a number less than the high-density configuration of FIG. 10) have refrigerant 1104 inserted.

Figure 12:
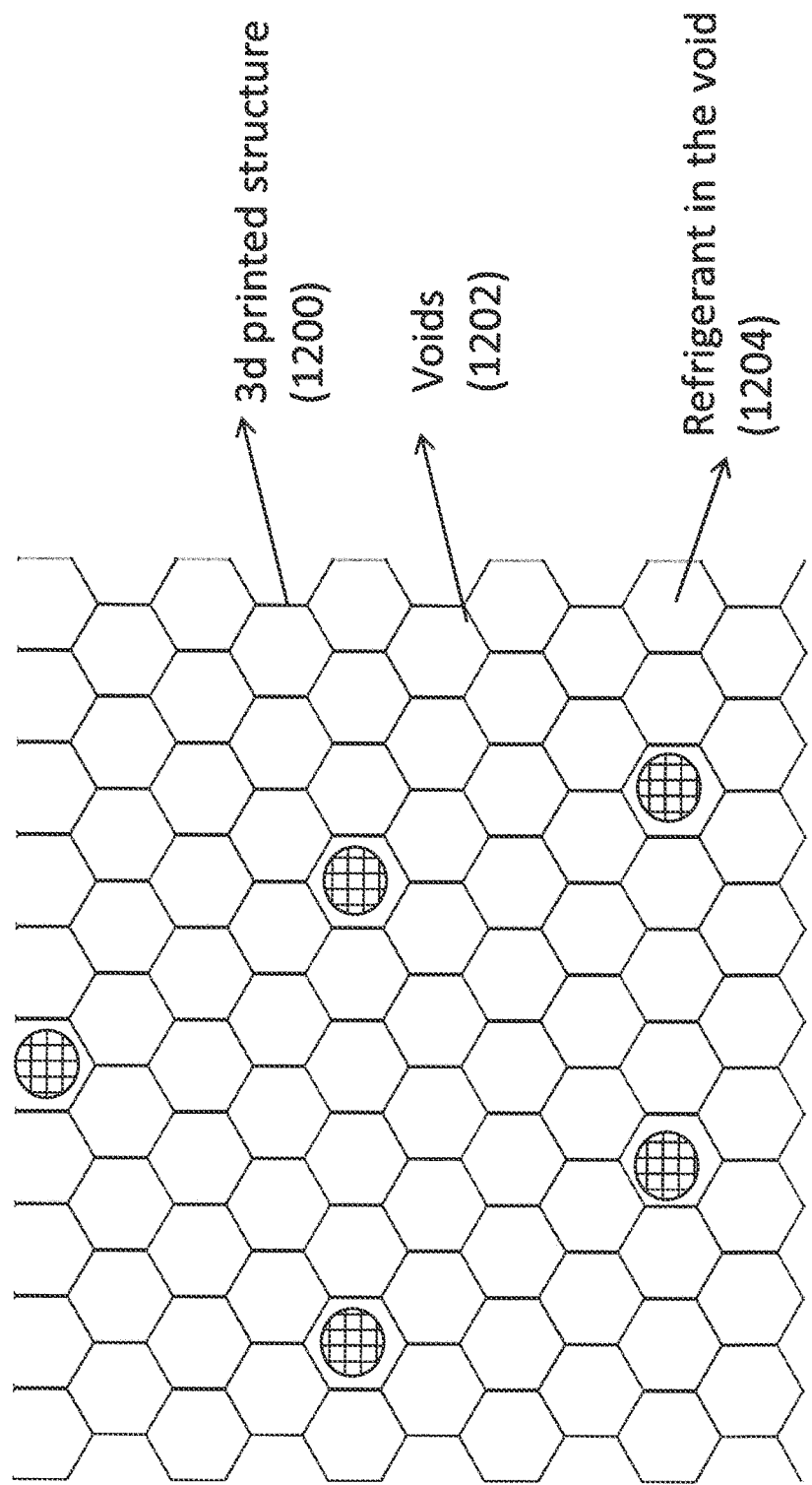
FIG. 12 comprises a diagram of aspects of a system as configured in accordance with various embodiments of these teachings.

Referring now to FIG. 12, one example of a package design with a low density of refrigerant incorporated into the design is described. The package design comprises a honeycomb structure 1200 with void volumes 1202 separated by walls. Refrigerant (e.g., dry ice) 1204 is inserted into the void volumes 1202. Since the example of FIG. 12 is a design with low amounts of refrigerant 1204 (an amount less than the medium density configuration), very few of the void volumes 1202 have refrigerant 1204 inserted.

Figure 13:
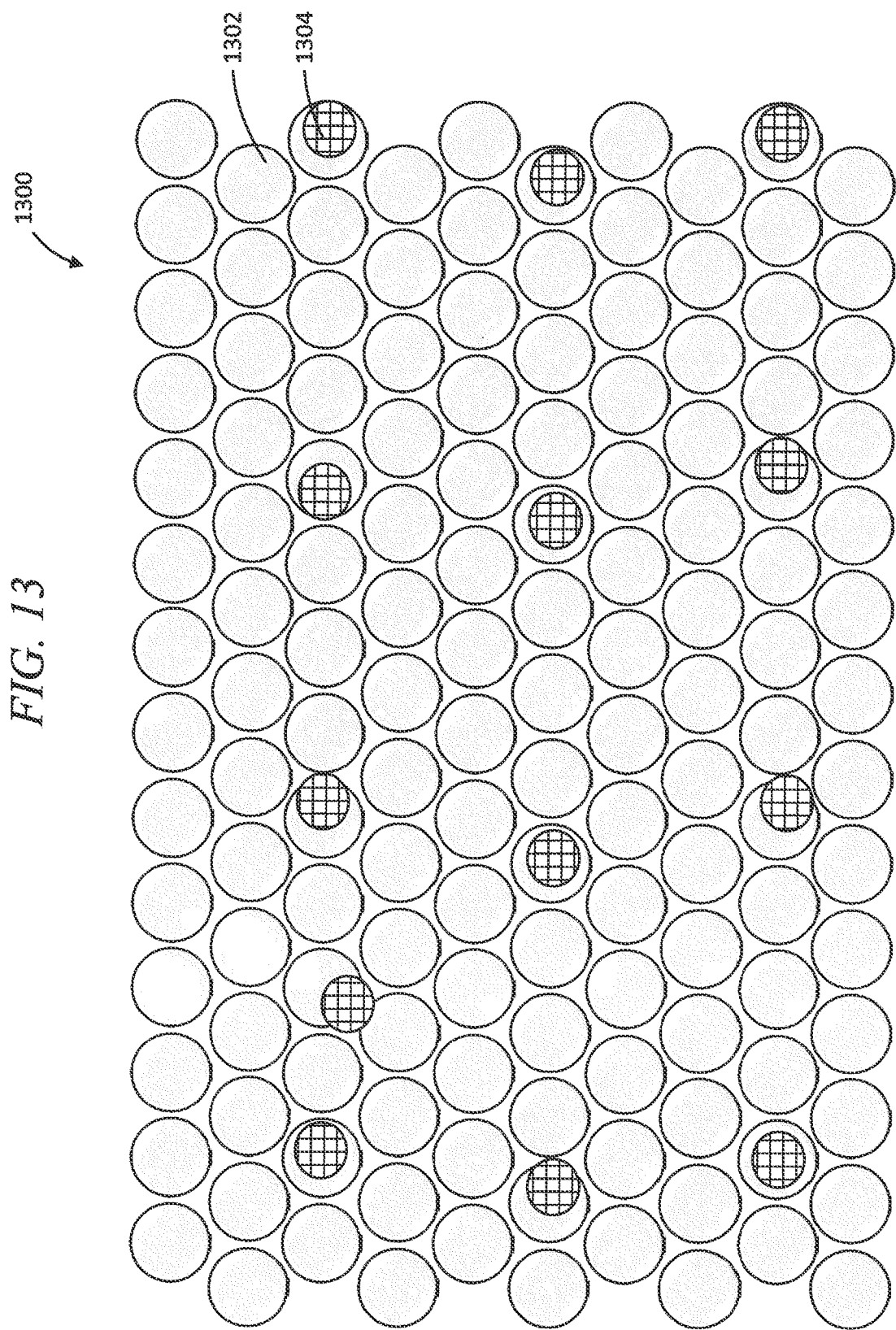
FIG. 13 comprises a diagram of aspects of a system as configured in accordance with various embodiments of these teachings.

Referring now to FIG. 13, an example of a non-honeycomb package structure is described. A structure 1300 includes void volumes 1302 separated or defined by walls. In contrast to the examples of FIGS. 10-12, the example of FIG. 13 is similar in structural integrity to bubble-wrap. Selected void volumes 1302 may be filled with refrigerant (e.g., dry ice) 1304. Thus, the structure of FIG. 13 may itself be inserted into another package (e.g., a cardboard box). Consequently, one of the structures (e.g., the cardboard box) provides much of the structural protection, while the other structure (the structure 1300) holds the refrigerant 1304.

Referring now to FIG. 14, one example of a package design 1400 with multiple compartments 1402, 1404, 1406, 1408, 1410, and 1412 is described. Each of the compartments 1402, 1404, 1406, 1408, 1410, and 1412 may have different dimensions and be surrounded by different protection structures (e.g., honeycomb structures of different thicknesses) and enclose different types of products. Additionally, each of the compartments 1402, 1404, 1406, 1408, 1410, and 1412 may have varying amounts and/or densities of refrigerant surrounding the compartment. In aspects, the temperature varies between the different compartments. For example, one of the compartments 1402, 1404, 1406, 1408, 1410, and 1412 may be maintained at 32 degrees F., another one of the compartments 1402, 1404, 1406, 1408, 1410, and 1412 may be maintained at −10 degrees F., and still another one of the compartments 1402, 1404, 1406, 1408, 1410, and 1412 is maintained at 0 degrees F.

In addition, certain ones of the compartments serve to add/provide protection and/or refrigerant to benefit others of the compartments. For example, the compartment 1402 is completely surrounded by the other compartments 1404, 1406, 1408, 1410, and 1412. The compartments 1404, 1406, 1408, 1410, and 1412 provide protection for the contents of compartment 1402. Similarly, the other compartments 1404, 1406, 1408, 1410, and 1412 help cool the compartment 1402 by insulating the compartment 1402 and by adding to the refrigerant that directly surrounds the compartment 1402.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system that is configured to optimize package structure and an amount of refrigerant for the shipment of refrigerated products, the system comprising:
    a user interface configured to receive consumer preference information from a customer, the customer preference information identifying one or more preferences of the customer concerning the timing or method of shipping a product from a shipping source to a shipping destination according to a delivery route;
    a database that is coupled to the user interface and is configured to store the customer preference information, the database also being configured to store product information, the product information being physical characteristics or cooling requirements of the product;
    a control circuit coupled to the database, and the user interface, the control circuit being configured to determine an optimal package structure and an amount of refrigerant to insert into the package structure based upon the product information, the consumer preference information, and environmental information concerning conditions along the delivery route, the optimal package structure and the amount of refrigerant being an optimized combination that is effective to both protect the product from damage and preserve the product from spoilage;
    a package construction apparatus that is coupled to the control circuit, the package construction apparatus configured to construct a package to contain the product according to the optimal package structure and to insert the amount of refrigerant into the structure as determined by the control circuit.

2. The system of claim 1, wherein the optimized package structure is designed so as to optimize a thickness of the package or a shape of the package.

3. The system of claim 1, wherein the optimal package structure is a honeycomb configuration.

4. The system of claim 3, wherein the honeycomb configuration includes gaps into which the refrigerant is selectively inserted.

5. The system of claim 1, wherein the optimal package structure includes a plurality of compartments to hold a plurality of products.

6. The system of claim 1, wherein the product is selected from the group consisting of a frozen product, a refrigerated product, or a chilled product.

7. The system of claim 1, wherein the refrigerant is dry ice.

8. The system of claim 1, wherein the package construction apparatus utilizes a printing process.

9. The system of claim 1, wherein the physical characteristics of the product includes product dimensions, product weights, product types, or cold chain requirements.

10. The system of claim 1, wherein the environmental information relates to weather conditions along the delivery route and wherein the system further comprises at least one sensor that is configured to obtain weather information concerning the weather conditions along the delivery route.

11. A method to optimize package structure and an amount of refrigerant for the shipment of refrigerated products, the method comprising:
    collecting consumer preference information from a customer, the customer preference information identifying one or more preferences of the customer concerning the timing or method of shipping a product from a shipping source to a shipping destination according to a delivery route;
    storing the customer preference information in a database, the database also storing product information, the product information being physical characteristics or cooling requirements of the product;
    obtaining environmental information concerning conditions occurring along the delivery route;
    determining an optimal package structure and an amount of refrigerant to insert into the package structure based upon the product information, the consumer preference information, and the environmental information, the optimal package structure and the amount of refrigerant being an optimized combination that is effective to both protect the product from damage and preserve the product from spoilage;
    constructing a package to contain the product according to the optimal package structure and inserting the amount of refrigerant into the structure.

12. The method of claim 11, wherein the optimized package structure is designed so as to optimize a thickness of the package or a shape of the package.

13. The method of claim 11, wherein the optimal package structure is a honeycomb configuration.

14. The method of claim 13, wherein the honeycomb configuration includes gaps into which the refrigerant is selectively inserted.

15. The method of claim 11, wherein the optimal package structure includes a plurality of compartments to hold a plurality of products.

16. The method of claim 11, wherein the product is selected from the group consisting of a frozen product, a refrigerated product, or a chilled product.

17. The method of claim 11, wherein the refrigerant is dry ice.

18. The method of claim 11, wherein constructing the package utilizes a printing process.

19. The method of claim 11, wherein the physical characteristics of the product includes product dimensions, product weights, product types, or cold chain requirements.

20. The method of claim 11, wherein the environmental information relates to weather conditions along the delivery route.

* * * * *